US012523074B2

(12) United States Patent
Bertani

(10) Patent No.: US 12,523,074 B2
(45) Date of Patent: Jan. 13, 2026

(54) HINGE FOR DOORS

(71) Applicant: ELESA S.p.A., Milan (IT)

(72) Inventor: Alberto Bertani, Milan (IT)

(73) Assignee: ELESA S.P.A., Milan (IT)

( * ) Notice: Subject to any disclaimer, the term of this patent is extended or adjusted under 35 U.S.C. 154(b) by 133 days.

(21) Appl. No.: 18/315,833

(22) Filed: May 11, 2023

(65) Prior Publication Data

US 2023/0374833 A1 Nov. 23, 2023

(30) Foreign Application Priority Data

May 19, 2022 (IT) ........................ 102022000010418

(51) Int. Cl.
*E05D 7/12* (2006.01)
*E05D 3/02* (2006.01)
(Continued)

(52) U.S. Cl.
CPC ............... *E05D 5/128* (2013.01); *E05D 3/02* (2013.01); *E05D 11/10* (2013.01); *E05D 2005/106* (2013.01)

(58) Field of Classification Search
CPC ....... E05D 7/10; E05D 7/1005; E05D 7/1016; E05D 7/1044; E05D 7/105; E05D 7/1022;
(Continued)

(56) References Cited

U.S. PATENT DOCUMENTS 2,058,341 A * 10/1936 Mink ........................ E05D 5/04 16/388
2,878,639 A * 3/1959 Cline ....................... A44C 5/06 411/548
(Continued)

FOREIGN PATENT DOCUMENTS

DE 3321558 C1 * 4/1985
DE 9203038 U1 4/1992
(Continued)

OTHER PUBLICATIONS

Search Report and Written Opinion for Italian Application No. 102022000010418 dated Dec. 9, 2022.

*Primary Examiner* — Chuck Y Mah
(74) *Attorney, Agent, or Firm* — Chrisman Gallo Tochtrop LLC

(57) ABSTRACT

Hinge for the mutual engagement of panels composed of two opposed wing-like elements (1, 2), each of them including a basic body provided with through-holes for housing fixing screws to a panel and with engagement means with the wing-like complementary element provided at a lateral end of said basic body, at the end of the mutual engagement area locking means (3) for engagement of one wing with respect to the other are provided, characterized in that the former of said wing-like elements (1) includes a basic body (14), having a rectangular trapezium profile, the end opposite to the vertical side of which being rounded in order to house a round-profiled cavity (15) therein; the latter of said wing-like elements (2) in turn includes a basic body (23) having a partially polygonal and partially rounded profile at the engagement end with the complementary wing-like elements (1), said rounded portion making up a cylindrical body that about halfway through along its height tapers to form a pin (23); the locking element (3) provides engagement and manoeuvring means on an outer surface and sealing engagement means of said wing-like means.

12 Claims, 7 Drawing Sheets

(51) Int. Cl.
*E05D 5/12* (2006.01)
*E05D 11/10* (2006.01)
*E05D 5/10* (2006.01)

(58) Field of Classification Search
CPC .......... E05D 7/1055; E05D 2007/1027; E05D 5/128; E05D 5/16; E05D 5/065; E05D 5/10; E05D 7/12; E05D 7/123; E05D 3/02; E05D 11/10; E05D 2007/126; E05D 2005/106; E05D 2005/108; E05D 2005/12; E05D 2005/125; E05D 2005/127; E05D 2005/128; H02B 1/38; H02B 1/44; H02B 1/46
See application file for complete search history.

(56) References Cited

U.S. PATENT DOCUMENTS

| | | | | |
|---|---|---|---|---|
| 4,334,338 | A * | 6/1982 | Conn | E05D 7/105 16/266 |
| 4,729,134 | A * | 3/1988 | Hillebrand | A47K 13/12 4/240 |
| 4,864,692 | A * | 9/1989 | Prevot | E05D 7/1022 16/386 |
| 6,941,617 | B2 * | 9/2005 | Pinto | E05D 7/1077 16/386 |
| 10,415,282 | B2 * | 9/2019 | Klaffke | E05D 7/1022 |
| 10,442,580 | B2 * | 10/2019 | Murrill | E05D 3/06 |
| 2005/0066476 | A1 * | 3/2005 | Van Parys | E05D 5/0238 16/342 |
| 2013/0180177 | A1 * | 7/2013 | Lazarevich | E05D 11/0054 16/319 |
| 2014/0252935 | A1 * | 9/2014 | McAdoo | E05D 3/02 16/221 |
| 2016/0130850 | A1 * | 5/2016 | Mohr | E05D 3/02 29/11 |
| 2020/0002986 | A1 * | 1/2020 | Smith | E05D 11/06 |
| 2022/0243511 | A1 * | 8/2022 | Kovach | E05D 5/0207 |
| 2022/0259908 | A1 * | 8/2022 | Gorontzi | E05D 7/1044 |

FOREIGN PATENT DOCUMENTS

| | | | |
|---|---|---|---|
| DE | 102019128325 | B3 | 10/2020 |
| EP | 0146651 | A1 * | 7/1985 |
| GB | 1486013 | A | 9/1977 |
| WO | 2007006372 | A1 | 1/2007 |

* cited by examiner

HINGE FOR DOORS

This application claims priority to Italian Patent Application 102022000010418 filed May 19, 2022, the entire disclosure of which is incorporated by reference herein.

FIELD OF THE INVENTION

The present invention relates to a hinge, in particular a hinge for removable panels equipped with a locking element.

STATE OF THE ART

Hinges for panels are extremely well known, and feature different possible forms, in most cases defined by specific functional requirements.

A hinge, in general, is composed of two opposite wing-like elements, equipped with mutual engagement means, typically composed of loops for the insertion of pins, or of a combination of a projecting loop appendix and a projecting appendix internally equipped with a pin suitable for insertion into said loop.

Normally, one of the two wings engages with the surface of a fixed wall, while the other is fastened to a moveable wall, such as a door. Nevertheless, it is possible to envisage hinges that keep in mutual engagement two moveable walls, such as two doors, or two panels, as it has been increasingly often observed in recent times, after the wide request for transparent plastic protection barriers to ensure social distancing and face protection.

Nevertheless, the development of walls even of a considerable length—and consequently weight—has entailed the need to achieve specific solutions capable of making the practice of such tools stable and safe, also ensuring the correct angle in order not to compromise the mechanical performances of the hinge.

Additionally, in some cases it is necessary to be reasonably sure, on one hand, that the panels are arranged in the desired position, with minimal margins of error, and on the other that they can be quickly released, in order to ensure the correct cleaning of the area and the immediate release of certain movement constraints of people and air and the quick creation of new paths.

It is also required that the mutual engagement of the panels is stable in any position they are arranged, that is the engagement is not exclusively bound to a vertical arrangement of the panels.

Eventually, there is a need to obtain a hinge that is able to axially lock the two sides of the hinge one to the other, preventing the accidental lifting and slipping out of the moveable door.

The object of the present invention, therefore, is to achieve a hinge for connecting panels, which allows to maintain a fixed and stable position, and at the same time to feature immediate free release of one panel from another.

Said object is achieved by a hinge for the mutual engagement of panels composed of two opposite wing-like elements, each of them comprising a basic body provided with through-holes housing screws for fastening to the panel and with engagement means with a wing-like element complementary therewith provided at one lateral end of said basic body, at the end of the mutual engagement area, locking means of one wing with respect to the other being provided, characterized in that

- the former of said wing-like means comprising a basic body, having a rectangular trapezoid profile, the end that is opposite to the vertical side of which is rounded so as to house a cavity with a circular profile therein;
- the latter of said wing-like means, in turn, comprising a basic body, having a partially polygonal and partially rounded profile at the engagement end with the complementary wing-like means, said rounded portion making up a cylindrical body that, at about halfway through its height, tapers to form a pin;
- the locking element provides engagement and manoeuvring means on the outer surface and engagement means for keeping said wing-like means.

Some particularly preferred features that make the described solution even more valuable in the eyes of the users are reported in the secondary claims.

BRIEF DESCRIPTION OF THE FIGURES

The finding is now described with reference to the attached drawings, aimed at representing in a merely illustrative and not limiting way a preferred embodiment of the hinge according to the invention, wherein.

DETAILED DESCRIPTION OF THE EMBODIMENTS

Figure 1:
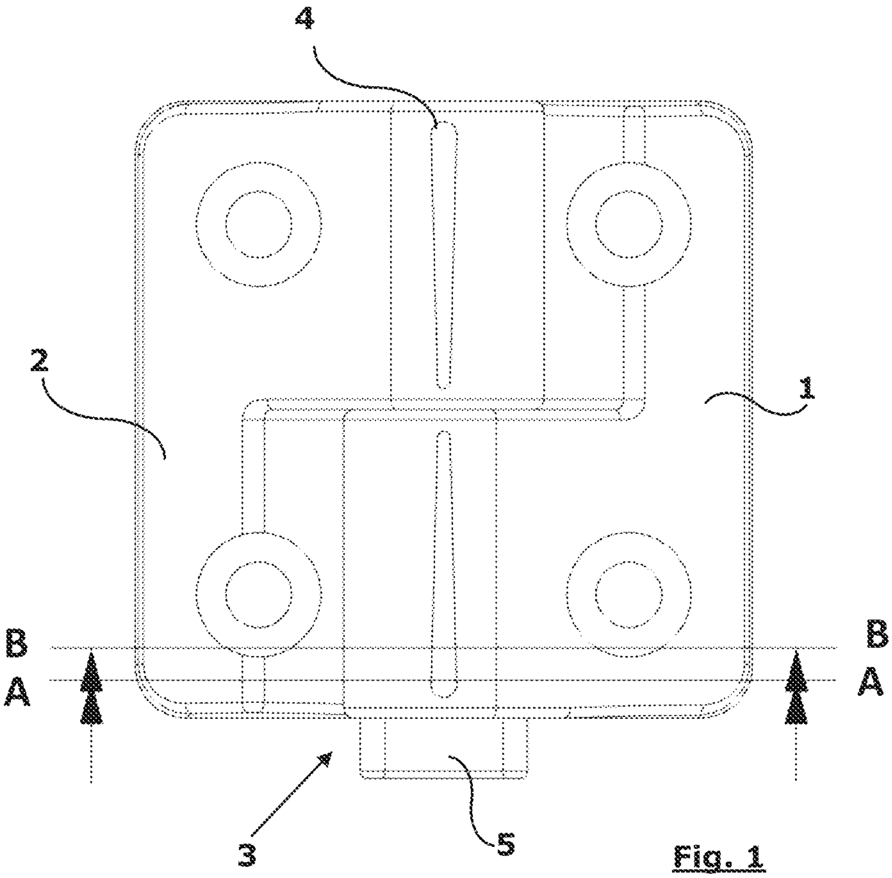
FIG. 1 is a front view of the hinge according to the invention just finished assembling.
Figure 2:
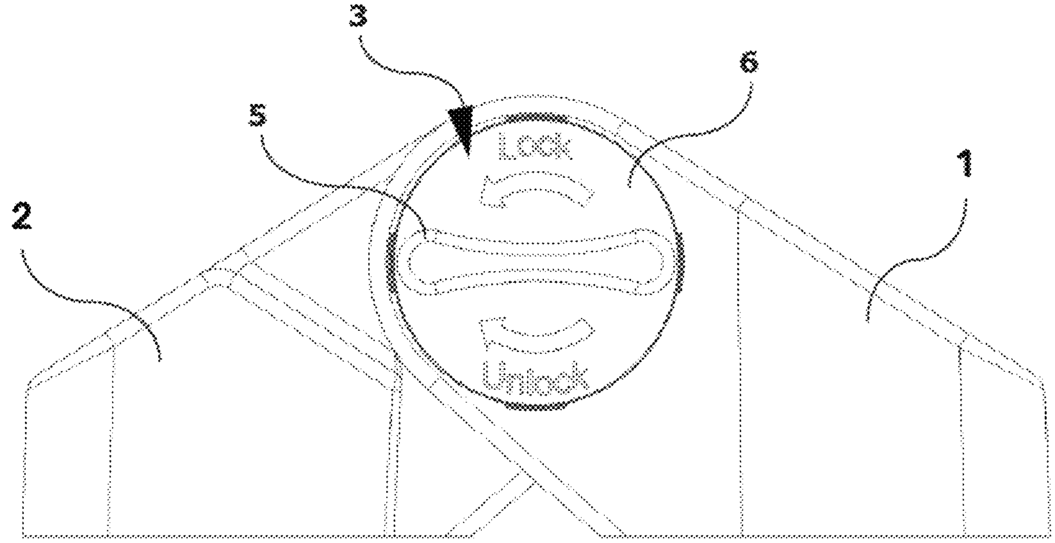
FIG. 2 is a top view of the hinge of FIG. 1.

The hinge according to the invention is composed of two opposed wing-like elements 1, 2, each of them comprising a basic body with an essentially rectangular profile, provided with through-holes for housing fixing screws to a panel and with engagement means with the complementary wing-like element 1, 2 provided at a lateral end of said basic body. At the end of the mutual engagement area between these two wings a locking element 3 is additionally provided.

On the mutual engagement surface of each of the two wings a reference frieze 4 is provided, to promote the correct mutual positioning during the assembly step, the alignment of the grooves 4 defining the perfect alignment of the angle of one wing with respect to the other.

In order to allow a correct movement of the locking element 3 an engagement and manoeuvring area is provided on the top of it, typically comprising an element of ergonomic gripping 5, or other analogous means. For example, a recess for the insertion of a manoeuvring key can be simply provided.

The locking element 3 comprising a disc-shaped body 6 carrying the engagement and manoeuvring element 5, on the surface facing outwards and a carousel element 7 on the opposite surface; inside said carousel body a central, cylindrical, internally hollow body 8 is arranged.

Said carousel element 7 comprising a shaped perimeter frame 9, provided with lightening cut-outs 10, ending on the free end with an annular band 11, along the external lateral profile of which an engagement tooth 12 extends, projecting with respect to the frame 9. The annular band 11, in correspondence with four columns 13 placed essentially under thin notches 14, internally displays weakening grooves of equal size to said columns. Further, three of said columns 13 have identical dimensions and one having a larger width than the others. In correspondence with the columns, tooth 12 projecting from said annular band 11 is made of a flexible material, in order to increase as it will be explained below—the engagement of said locking element 3 with the hinge body.

Figure 10A:
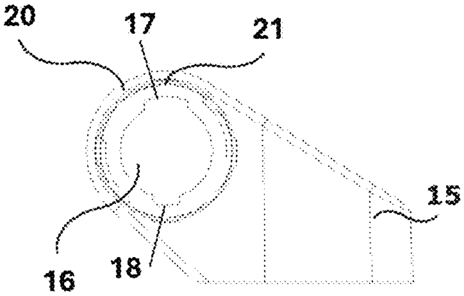
FIGS. 10*a*, 10*b*, 10*c*, 10*d*, 10*e*, 10*f*, 10*g* are top, bottom, right and left side, front and cross-sectional along the F-F axis and cross sectional along the G-G axis views, respectively of a wing of the hinge according to the invention.
Figure 10B:
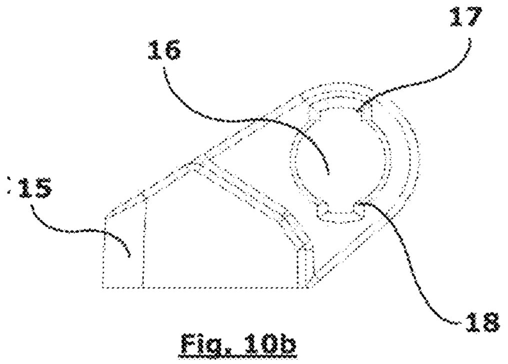
Figure 10C:
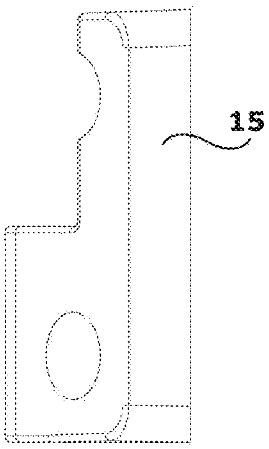
Figure 10E:
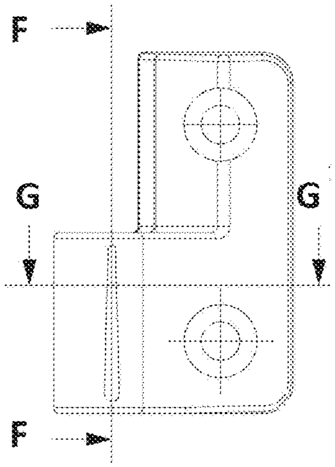
Figure 10G:
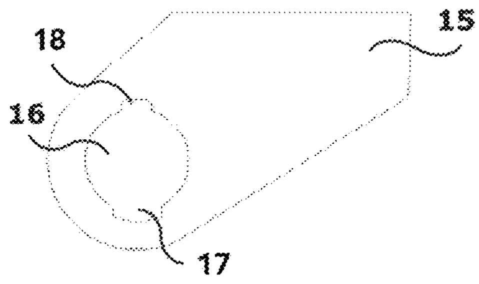
Figure 10F:
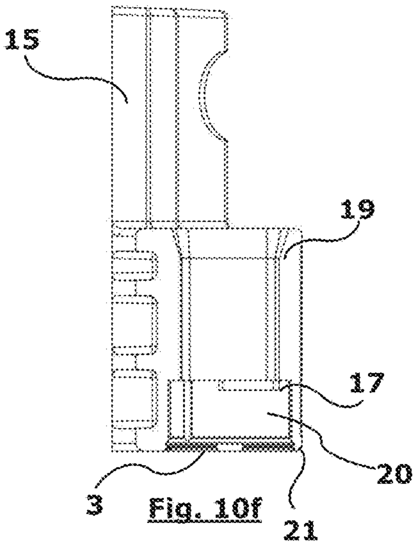
Figure 10D:
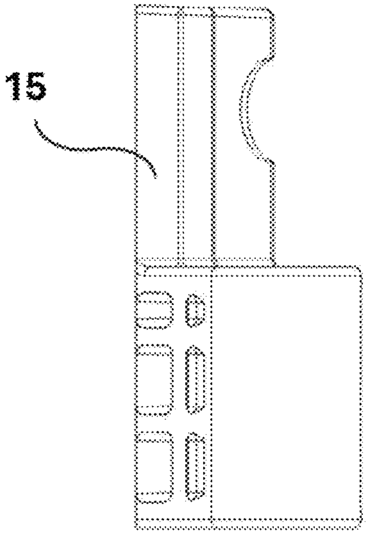
Figure 11A:
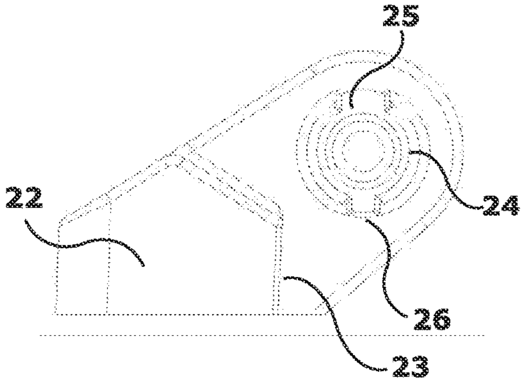
FIGS. 11*a*, 11*b*, 11*c*, 11*d*, 11*e*, 11*f* are top, bottom, right and left side, front and cross-sectional along the H-H axis views, respectively of the other wing of the hinge according to the invention.
Figure 11B:
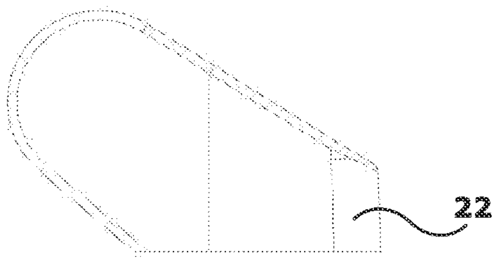
Figure 11C:
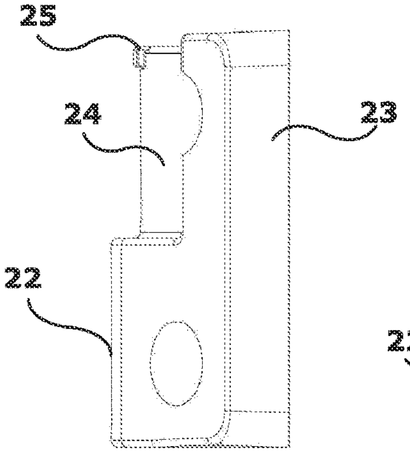
Figure 11F:
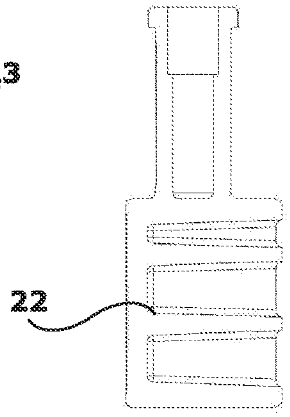
Figure 11E:
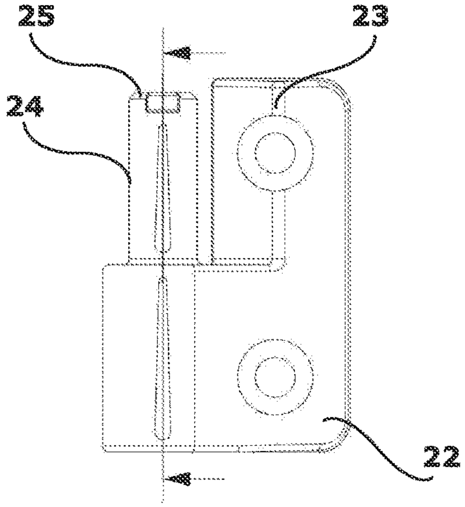
Figure 11D:
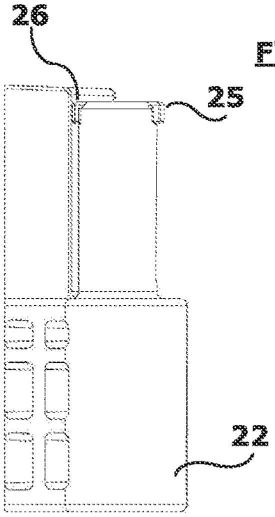

The first of said wing-like means 1 comprising a basic body 15, having a rectangular trapezium profile, the end opposite to the vertical side of which being rounded so as to house a cavity 16 having a rounded profile therein, internally shaped in such a way that two invitation grooves 17 and 18 are present, the groove 17 having a larger width than groove 18. As it can be observed from FIG. 10*g*, said grooves involve the whole cylindrical cavity with a rounded profile 16.

Said cavity 16 of said basic body 15 provides a thickening 19 halfway through its height starting from the area of contact and engagement with the other wing, which determines the making up of a chamber 20 for housing the engagement surface of said locking element 3. On the surface of said thickening 19 identifying said chamber 20 matching parts 21 are provided, for housing the engagement tooth 12 made of a flexible material provided on said locking element 3.

The latter of said wing-like means 2, in turn, is composed of a basic body 22, having a partially polygonal and partially rounded profile at one end, that is the engagement end with the other wing. The basic polygon comprising a trapezoidal prism 23 from which a cylindrical body laterally extends, which about halfway through its height tapers to form a pin 24. In correspondence with the tapering, the prism 23 takes the profile of an irregular pentagon, concave on one of the minor sides, namely the one closest to the pin 24.

Pin 24 comprising an internally hollow cylinder provided at one end of two opposed engagement teeth 25, 26, of different sizes, suitable to slide-complementary with them-inside the invitation grooves 17, 18.

The mounting of the hinge is relatively simple: after fastening one wing on the door side and one wing on the frame side with screws, the user inserts the pin of the hinge of the shutter side in the corresponding site of the frame side, taking care to align them using the frieze identifying the alignment line, obtaining then the coplanarity of the door and frame planes.

The pin 24 of the hinge is inserted in the cylindrical cavity 16 of the complementary wing 1, 2, the protruding teeth 25, 26 being inserted in suitable grooves 17, 18 provided along the internal walls of said cylindrical cavity 16, and finding housing in a recess of larger diameter provided on the top of said cylindrical cavity. In said recess, the pin 24 is free to rotate and is able to exit its site only in case of a precise alignment of the teeth 25, 26 with their corresponding grooves 17, 18.

Figure 6:
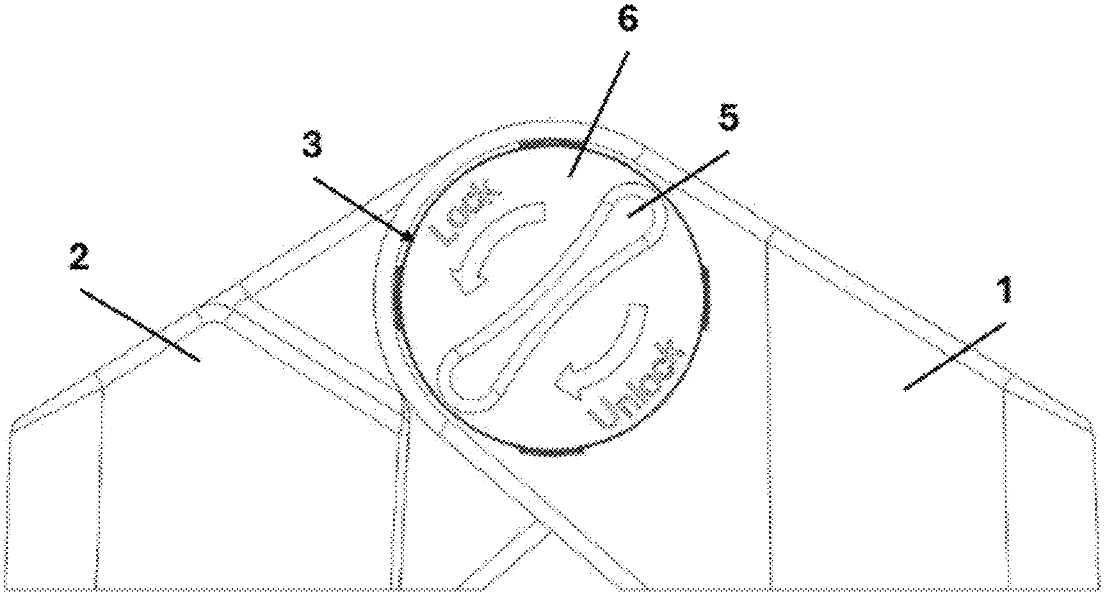
FIG. 6 is a top view of the hinge of FIG. 5.

Once the matching phase is concluded, the user insists on the engagement and manoeuvring body, using optional required tools, causing a 45° rotation of the locking element 3 as seen in FIG. 6, and in such a way achieving the locking of the panel with respect to the frame. In particular, the 45° rotation of the locking element is determined by the engagement of the teeth 25, 26 at the top of pin 24 with the annular band 11, although it does not define its certain positioning.

Similarly, for the disengagement of the panel with respect to the frame, it is enough to unlock, with the optionally required tool, the engagement and manoeuvring area and subsequently to lift the door, to be able then to proceed with other related activities.

Figure 3:
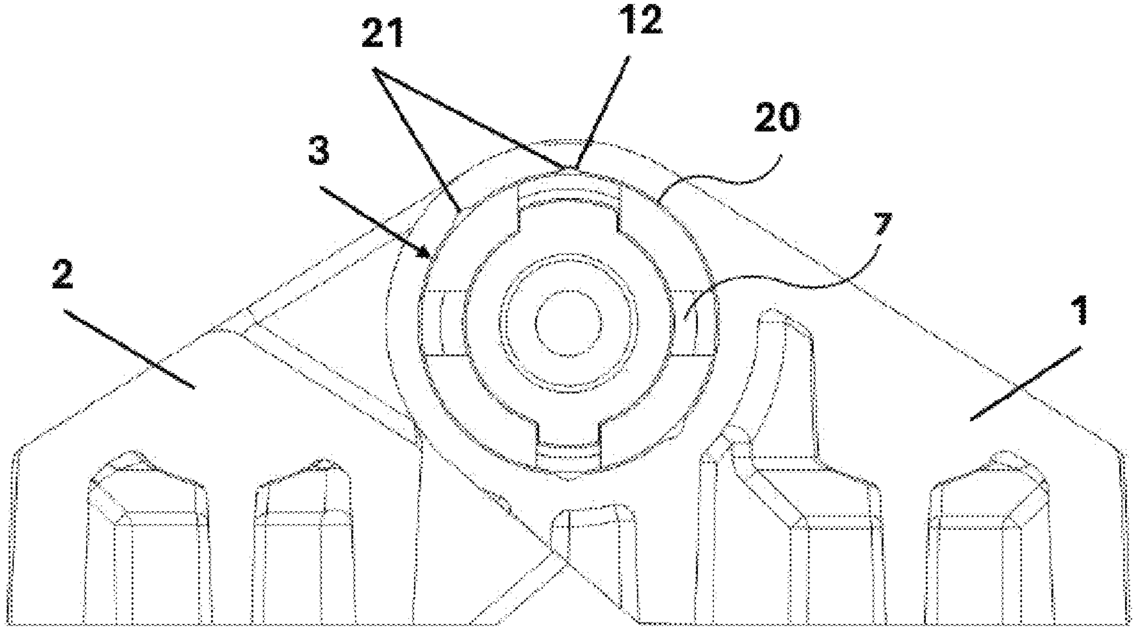
FIG. 3 is a cross-sectional view along the A-A axis of the hinge of FIG. 1.
Figure 4:
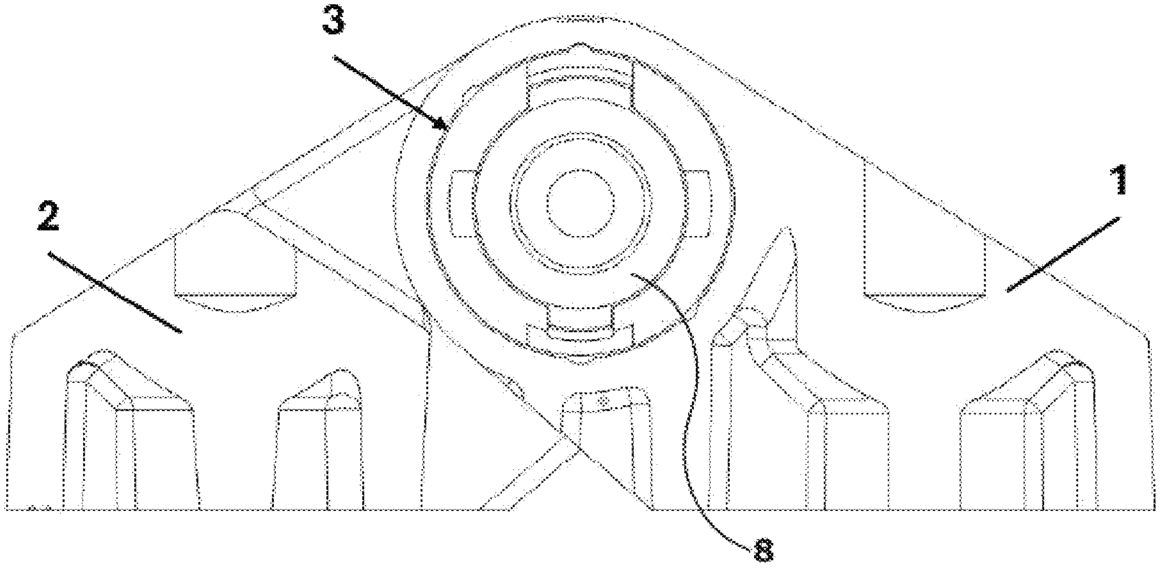
FIG. 4 is a cross-sectional view along the B-B axis of the hinge of FIG. 1.
Figure 5:
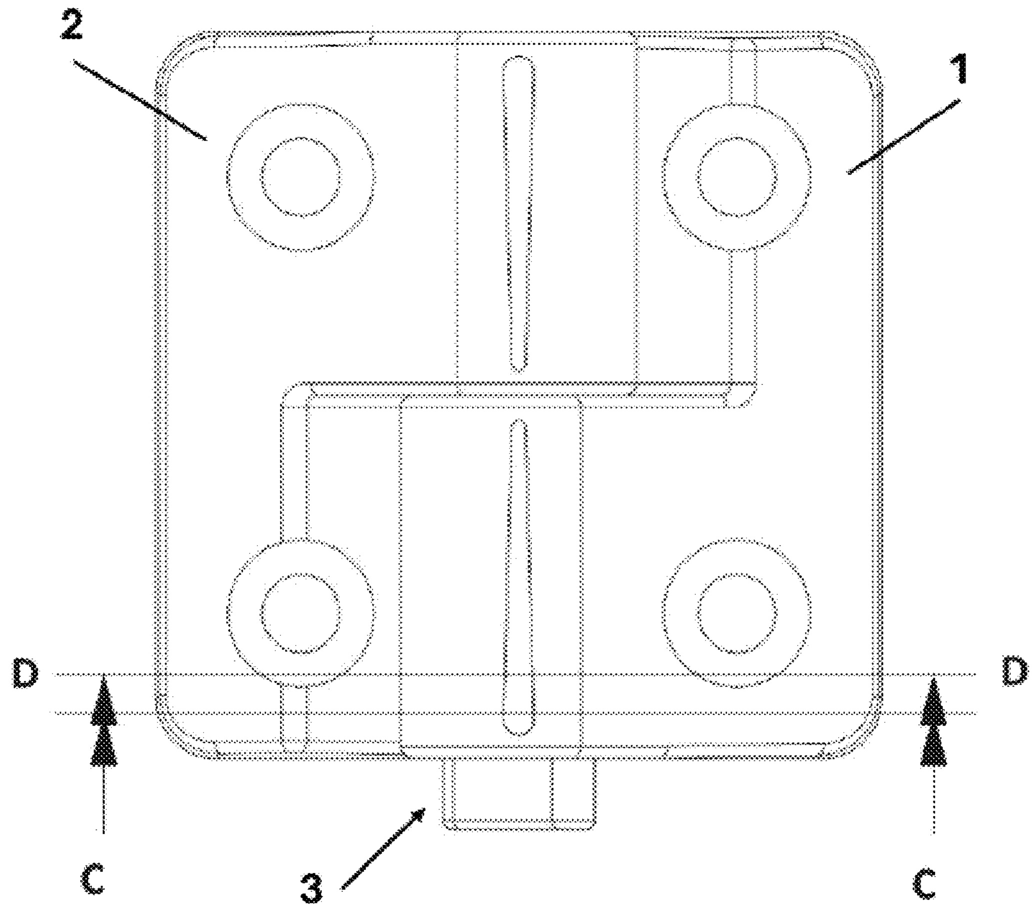
FIG. 5 is the view of FIG. 1 with the locking element in a loaded position.
Figure 7:
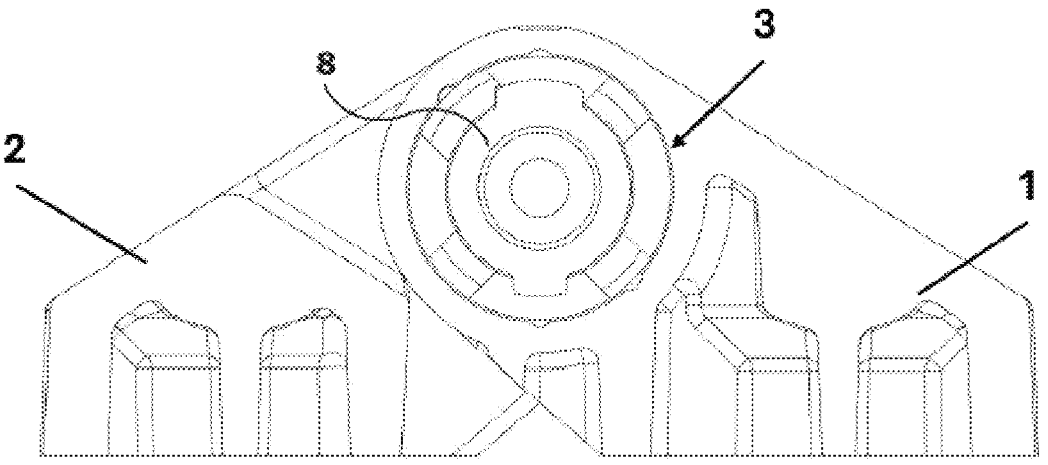
FIG. 7 is a cross-sectional view along the C-C axis of the hinge of FIG. 5.
Figure 8:
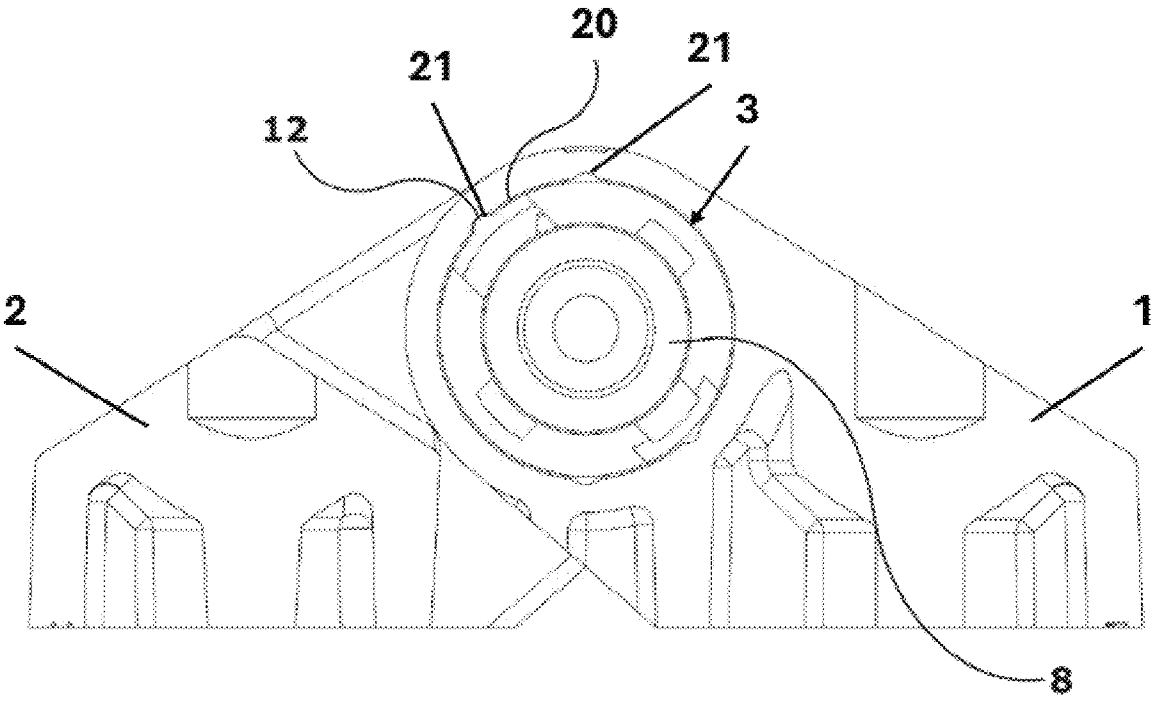
FIG. 8 is a cross-sectional view along the D-D axis of the hinge of FIG. 5.
Figure 9A:
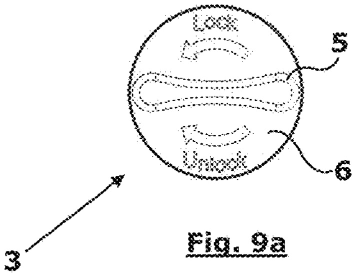
FIGS. 9*a*, 9*b*, 9*c*, 9*d*, 9*e*, 9*f* are top, bottom, right and left side, front and cross-sectional, along the E-E axis views, respectively, of the cap of the hinge according to the invention.
Figure 9B:
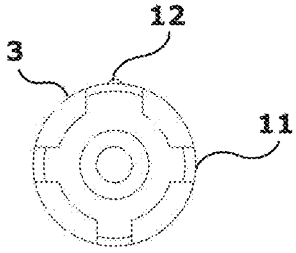
Figure 9D:
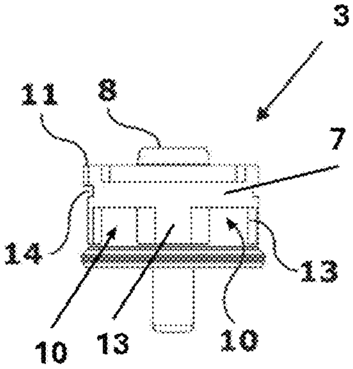
Figure 9E:
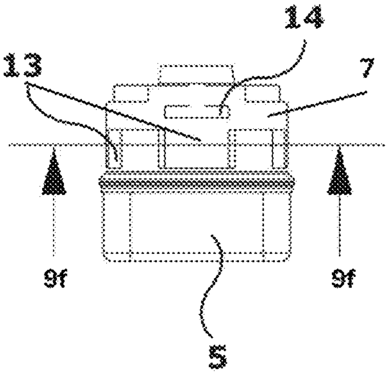
Figure 9C:
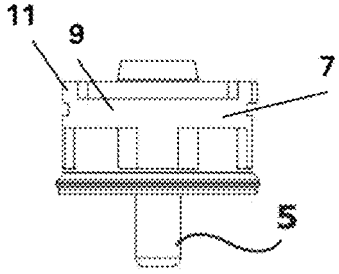
Figure 9F:
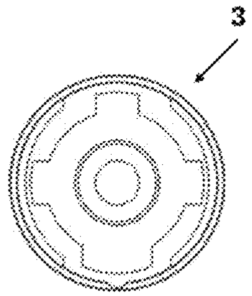

Since the rotation of the hinge might determine a shift of the locking element 3, a projecting and flexible tooth 12 is further provided. Such tooth 12 engages with the matching parts 21 of the locking body 1 in the a first position at 0° and a second position at 45°, preventing its rotation. Then, the user brings the two sides of the hinge into engagement and rotates the locking element 3. Teeth 25 and 26 engage with corresponding grooves 17 and 18, as it is well seen in FIG. 3. When the hinge rotates, the bigger tooth 25 cannot be released, because the hinge cannot rotate of 45° in negative, and the bigger groove 17 through which it entered is no longer available; only the smaller groove 18 is available, from which the bigger tooth 25 cannot exit, as it can be understood from FIG. 7.

The so obtained structure, with the particular two-wing shape, with the mutual engagement areas composed of a trapezoidal prism and a cylinder, allows a particularly wide rotation angle of one wing with respect to the other, comprised between −15° and 180°.

As it is clear, a similar solution allows operating on the panel in a short time and with both hands completely free to manage it, without the risk of falls of the tools used for the unlock, or of the panel itself.

It is also clear that the so-obtained hinge is able to axially lock the two sides of the hinge one to the other, preventing the door to lift or slip unintentionally.

As it appears completely clear also to an average experienced user that had to deal with this kind of product, the solution now described appears particularly useful for horizontal hatches, for which the gravity effect is obviously much more limited and the free sliding of the hatch with respect to the frame appears to be a not neglectable

The invention claimed is:

1. A hinge for the mutual engagement of panels, the hinge comprising:

two opposed wing-like elements (1, 2) pivotally engaged to each other, each wing-like element comprising a basic body provided with through-holes configured to house screws that are configured to fasten each wing-like element to a panel, and a locking element (3) configured to engage with the two opposed wing-like elements (1, 2) at a lateral end of said two opposed wing-like elements when the two opposed wing-like elements (1, 2) are in an engaged position, to prevent said two wing-like elements from lift-off separation, a first wing-like element (1) of the two opposed wing-like elements comprising a basic body (15) with a generically quadrilateral profile and a rounded end extending therefrom having a circular cavity (16) therein;

a second wing-like element (2) of the two opposed wing-like elements comprising a basic body (22) with a partially polygonal profile and a partially rounded profile at an end configured to engage with the first wing-like element (1), said end having a tapered cylindrical body forming a pivot pin (24) configured to be received in said circular cavity;

wherein said locking element (3) is positioned in said circular cavity opposite said pivot pin and includes an engagement and manoeuvring means (5) on an outer surface thereof and an engagement tooth (12) configured to engage with a matching part (21) of the circular cavity (16), wherein said circular cavity (16) of said basic body (15) of the first wing-like element (1) includes an upper thickening portion (19) extending for half a height of the circular cavity (16), said upper thickening portion (19) including two invitation grooves (17, 18) having different widths, wherein at a lower portion of the circular cavity (16) opposite the upper thickening portion (19), a housing chamber (20) is formed and configured to engage said locking element (3).

2. The hinge as in claim 1, wherein said matching part comprises two opposite slits (21) formed in a peripheral surface of said chamber, for selectively housing the engagement tooth (12) made of flexible material provided on said locking element (3).

3. The hinge as in claim 1, wherein the second wing-like element (2) includes a trapezoidal prism having the profile of an irregular pentagon and is concave along a side located at a smallest distance to said pin (24).

4. The hinge as in claim 1, wherein said locking element (3) comprises a disc-shaped body (6) configured to carry, on an outside facing surface, said engagement and manoeuvring means (5) and, on an inside facing surface, a carousel element (7) within which a cylindrical, central, hollow body (8) is arranged.

5. The hinge as in claim 4, wherein said carousel element (7) comprises a shaped perimeter frame (9) provided with lightening cut-outs (10) ending on a free end having an annular band (11) configured to engage two opposite engagement teeth (25, 26) provided at one end of said pin (24), said engagement tooth (12) extending from said annular band (11).

6. The hinge as in claim 5, wherein said annular band (11) on its internal surface, in correspondence with four columns (13) arranged under thin notches (14), includes weakening grooves of a size equal to said columns (13).

7. The hinge as in claim 6, wherein three columns of said four columns (13) are identical in width and one column of said four columns is larger in width.

8. The hinge as in claim 5, wherein said two opposite engagement teeth (25, 26), of different sizes, are configured to slide within the two invitation grooves (17, 18).

9. The hinge as in claim 1, wherein said engagement and manoeuvring means of said locking element (3) comprises a recess configured for insertion of a manoeuvring key.

10. The hinge as in claim 1, wherein said engagement tooth (12) is configured to engage with the matching part (21) of the circular cavity (16) in two positions, namely 0° and 45° with respect to the circular cavity (16).

11. The hinge as in claim 1, wherein a reference frieze (4) is provided on each of said wing-like elements (1, 2), said reference friezes (4) being configured to define an alignment position of an angle of one wing-like element with respect to the other.

12. The hinge as in claim 1, wherein an angle swept by said first wing-like element (1) with respect to said second wing-like element (2) ranges between −15° and 180°.

* * * * *